United States Patent
Seo et al.

(10) Patent No.: US 10,399,026 B2
(45) Date of Patent: Sep. 3, 2019

(54) LONG-LIFE AIR FILTER FOR AUTOMOBILES AND METHOD OF MANUFACTURING THE LONG-LIFE AIR FILTER

(71) Applicants: HYUNDAI MOTOR COMPANY, Seoul (KR); KIA MOTORS CORPORATION, Seoul (KR)

(72) Inventors: Yong Gyo Seo, Suwon-si (KR); Ju Yong Lee, Suwon-si (KR); Seong Youn Kwak, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 393 days.

(21) Appl. No.: 15/270,724

(22) Filed: Sep. 20, 2016

(65) Prior Publication Data
US 2017/0225110 A1    Aug. 10, 2017

(30) Foreign Application Priority Data
Feb. 5, 2016    (KR) .................. 10-2016-0014617

(51) Int. Cl.
*B01D 46/00*    (2006.01)
*B01D 39/16*    (2006.01)
(Continued)

(52) U.S. Cl.
CPC ....... *B01D 46/0036* (2013.01); *B01D 39/163* (2013.01); *B01D 46/0001* (2013.01); *B01D 46/0023* (2013.01); *B01D 53/261* (2013.01); *F02M 35/02441* (2013.01); *B01D 2239/0407* (2013.01); *B01D 2239/0464* (2013.01); *B01D 2239/065* (2013.01); *B01D 2239/0618* (2013.01); *B01D 2239/0659* (2013.01); *B01D 2239/10* (2013.01); *B01D 2239/1216* (2013.01); *B01D 2239/1291* (2013.01); *B01D 2253/106* (2013.01); *B01D 2253/302* (2013.01);
(Continued)

(58) Field of Classification Search
CPC .............. B01D 39/1623; B01D 39/163; B01D 46/0001; B01D 46/0036; B01D 2239/0407; B01D 2239/065; B01D 2239/10; B01D 2239/1216; B01D 2239/1291; B01D 2275/10; B01D 2279/60; F02M 35/024; F02M 35/02441
See application file for complete search history.

(56) References Cited

U.S. PATENT DOCUMENTS 6,315,805 B1 * 11/2001 Strauss .............. B01D 39/1623
                                                                55/486
8,518,152 B2    8/2013 Lee et al.
(Continued)

FOREIGN PATENT DOCUMENTS

JP    09-173893 A    7/1997
JP    2003-299921 A    10/2003
(Continued)

*Primary Examiner* — Jason M Greene
(74) *Attorney, Agent, or Firm* — Morgan, Lewis & Bockius LLP

(57) ABSTRACT

An air filter for automobiles includes, a main filter and a prefilter, wherein the prefilter comprises a nonwoven synthetic fiber having an average density of 0.01 to 0.5 g/cm³ and a moisture absorbent is adsorbed to the prefilter.

18 Claims, 3 Drawing Sheets

(51) Int. Cl.
   *B01D 53/26*   (2006.01)
   *F02M 35/024*  (2006.01)
(52) U.S. Cl.
   CPC ...... *B01D 2257/80* (2013.01); *B01D 2258/06* (2013.01); *B01D 2259/4566* (2013.01); *B01D 2267/40* (2013.01); *B01D 2275/10* (2013.01); *B01D 2279/60* (2013.01)

(56) References Cited

U.S. PATENT DOCUMENTS

| | | | | |
|---|---|---|---|---|
| 2003/0150199 | A1* | 8/2003 | Tanaka | B01D 39/1623 55/486 |
| 2008/0026041 | A1* | 1/2008 | Tepper | B01D 39/2017 424/445 |
| 2011/0067574 | A1* | 3/2011 | Walz | F02M 35/024 96/422 |
| 2011/0132195 | A1  | 6/2011 | Lee et al. | |
| 2012/0193282 | A1* | 8/2012 | Wolf | B01D 39/1623 210/484 |
| 2013/0000654 | A1* | 1/2013 | Osinenko | B01J 20/28028 131/331 |
| 2014/0224727 | A1* | 8/2014 | Yu | B01D 39/1623 210/491 |
| 2016/0129383 | A1* | 5/2016 | Volk | B01D 46/0036 96/131 |

FOREIGN PATENT DOCUMENTS

| | | |
|---|---|---|
| JP | 5033842 B2 | 9/2012 |
| KR | 10-0263816 B1 | 8/2000 |
| KR | 10-2009-0039040 A | 4/2009 |
| KR | 10-0971512 B1 | 7/2010 |
| KR | 10-2011-0062450 A | 6/2011 |
| KR | 10-2013-0071065 A | 6/2013 |

* cited by examiner

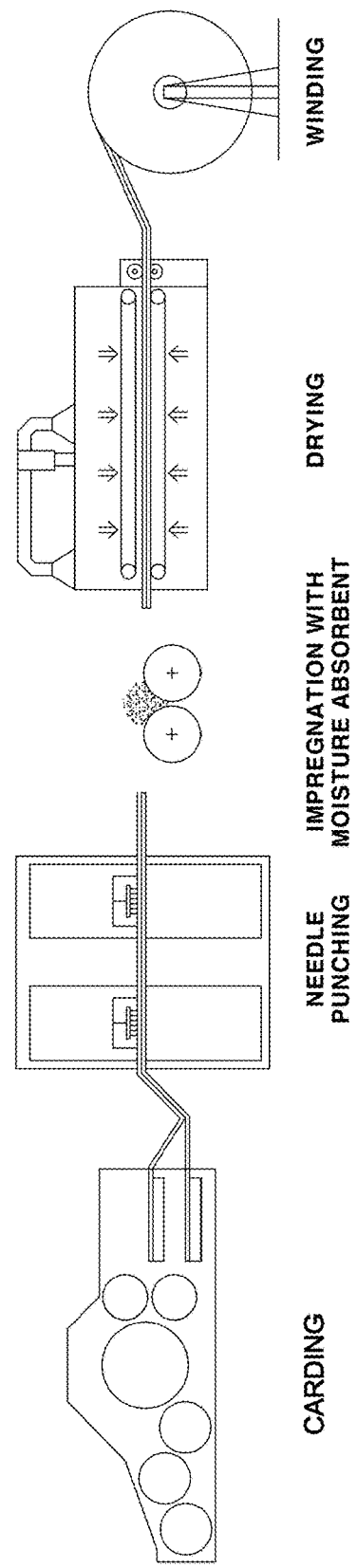

LONG-LIFE AIR FILTER FOR AUTOMOBILES AND METHOD OF MANUFACTURING THE LONG-LIFE AIR FILTER

CROSS-REFERENCE TO RELATED APPLICATION

This application claims under 35 U.S.C. § 119(a) the benefit of priority to Korean Patent Application No. 10-2016-0014617, filed on Feb. 5, 2016 with the Korean Intellectual Property Office, the entire contents of which are incorporated herein by reference.

TECHNICAL FIELD

The present disclosure relates to a long-life air filter for automobiles and a method of manufacturing the long-life air filter. More particularly, the disclosure relates to a long-life air filter for automobiles including a prefilter and a main filter to greatly increase a dust collection amount by collecting ultrafine dust particles, facilitate adsorption using only a nanoscale moisture absorbent without a separate binder, and enhance engine lifespan due to an increase of a dust collection amount of a filter through moisture absorption and, accordingly, the enhancement of abrasion resistance and durability of the engine, and a method of manufacturing the same.

BACKGROUND

Automobile engines operating with power generated by pressure occurring due to combustion of a fuel-air mixture including air in a combustion chamber of a cylinder include intake devices, which intake air from outside of the engine, mixes the air with a fuel, and transfers the formed fuel-air mixture to the engine. An intake device may include an air filter for filtering and removing impurities such as dust included in air intaken by negative pressure of an engine. The air filter filters impurities (dust, moisture, etc.) included in intaken air and supplies the filtered air to a cylinder. In addition, the air filter reduces intake noise and prevents abrasion of components of an air intake system and oil contamination by blocking a combustion flame upon the occurrence of a backfire.

Supply of clean air by such an air filter is important with regard to an engine lifespan extension, an output increase, a fuel efficiency increase, etc. Meanwhile, research into accomplishing maximum filtering efficiency considering an output decrease of an engine due to intake resistance and noise generation is underway.

However, in the case of existing air cleaners, an exchange cycle of an air filter is relatively short in a high-dust environment, thereby increasing maintenance costs. In addition, ultrafine micrometer-scale dust is not normally filtered and dust collected from air may escape from, and pass through, the air filter.

Therefore, there is a need for a novel air filter to enhance a lifespan of a filter by increasing a collection amount of fine dust per unit area while preventing an escape of dust from the filter, which is collected from intake air.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with prior art.

The inventors of the present disclosure manufactured a long-life air filter for automobiles including a prefilter made of a nonwoven synthetic fiber having a specific average density and a main filter formed of three-layer nonwoven synthetic fibers having specific average pore sizes, which include a moisture absorbent adsorbed thereto and confirmed that, by using the long-life air filter, a dust collection amount greatly increases due to collection of ultrafine dust particles, adsorption is facilitated using only a nanoscale moisture absorbent without a separate binder, and engine lifespan is enhanced due to an increase of dust collection amount of a filter through moisture absorption, thereby enhancing abrasion resistance and durability of the engine.

Therefore, it is an object of the present disclosure to provide a long-life air filter for automobiles having an increased dust collection amount and lifespan.

It is another object of the present disclosure to provide a long-life air filter for automobiles, a dust collection amount of which is greatly increased, compared to existing filters, by collecting ultrafine dust particles.

It is yet another object of the present disclosure to provide a long-life air filter for automobiles, to which a prefilter and main filter including a moisture absorbent adsorbed thereto are applied.

In accordance with an aspect of the present disclosure, the above and other objects can be accomplished by the provision of an air filter for automobiles including a main filter and a prefilter, wherein the prefilter includes a nonwoven synthetic fiber having an average density of 0.01 to 0.5 $g/cm^3$ and a moisture absorbent is adsorbed to the prefilter.

In accordance with another aspect of the present disclosure, there is provided an air filter for automobiles including a main filter and a prefilter, wherein the prefilter is made of a first nonwoven synthetic fiber layer having an average density of 0.031 to 0.5 $g/cm^3$; and a second nonwoven synthetic fiber layer having an average density of 0.01 to 0.03 $g/cm^3$, wherein a moisture absorbent is adsorbed to the prefilter.

In accordance with yet another aspect of the present disclosure, there is provided a method of manufacturing a long-life air filter for automobiles, the method including: (a) a step of forming a nonwoven web after carding a synthetic fiber; (b) a step of combining the web by a needle punching process; (c) a step of respectively forming a main filter and a prefilter by allowing the combined web to pass through a press roll; (d) a step of respectively impregnating the main filter and the prefilter with a moisture absorbent solution; (e) a step of respectively drying the impregnated main filter and prefilter; and (f) a step of manufacturing an air filter by laminating the prefilter on the main filter.

Other aspects and preferred embodiments of the disclosure are discussed infra.

BRIEF DESCRIPTION OF THE DRAWINGS

The above and other features of the present disclosure will now be described in detail with reference to exemplary embodiments thereof illustrated in the accompanying drawings which are given hereinbelow by way of illustration only, and thus are not limitative of the present disclosure, and wherein:

FIG. 5 is a process flow diagram illustrating a manufacturing process of an air filter according to embodiments of the present disclosure.

Figure 1:
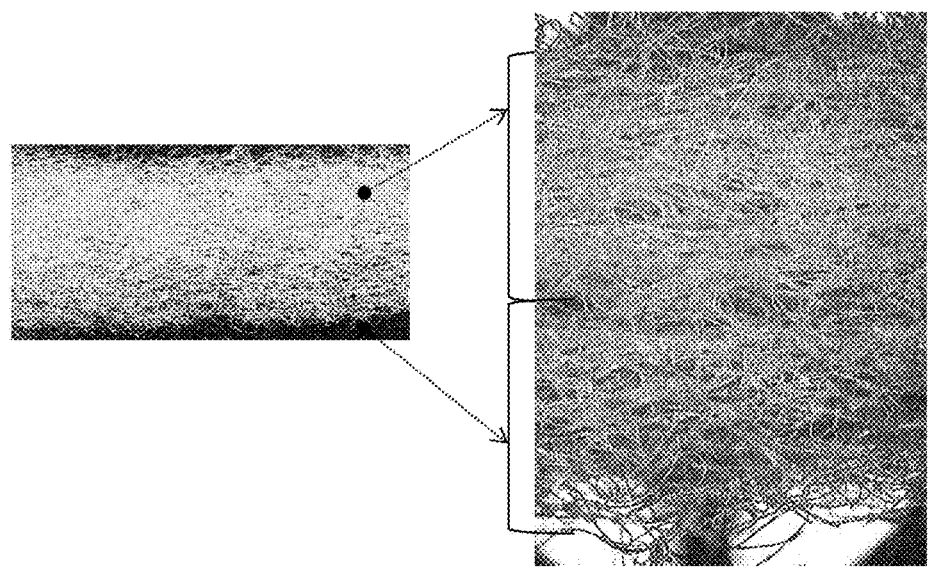
FIG. 1 illustrates sectional views of a second prefilter manufactured according to Manufacturing Example 2 of the present disclosure.

It should be understood that the appended drawings may not be necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which are included within the spirit and scope of the disclosure as defined by the appended claims.

The present disclosure provides an air filter for automobiles including a main filter and a prefilter, wherein the prefilter may include a nonwoven synthetic fiber having an average density of 0.01 to 0.5 $g/cm^3$ and a moisture absorbent may be adsorbed to the prefilter.

In particular, the prefilter may be made of a nonwoven synthetic fiber having an average density of 0.01 to 0.5 $g/cm^3$. When the average density is less than 0.01 $g/cm^3$, dust collection effect may be poor. When the average density is greater than 0.5 $g/cm^3$, intake pressure of an engine may increase.

In addition, the present disclosure provides an air filter for automobiles including a main filter and a prefilter, wherein the prefilter may be made of a first nonwoven synthetic fiber layer having an average density of 0.031 to 0.5 $g/cm^3$; and a second nonwoven synthetic fiber layer having an average density of 0.01 to 0.03 $g/cm^3$, wherein a moisture absorbent may be adsorbed to the prefilter.

In particular, the prefilter may be composed of two layers so as to increase a dust collection amount and dust collection efficiency. Here, a first nonwoven synthetic fiber layer of the two layers may collect large-size dust and a second nonwoven synthetic fiber layer thereof may increase small-size dust collection efficiency. The first nonwoven synthetic fiber layer may have an average density of 0.031 to 0.5 $g/cm^3$, and the second nonwoven synthetic fiber layer may have an average density of 0.01 to 0.03 $g/cm^3$. Here, the prefilter may be formed of a two-layer nonwoven layer having a different density gradient so as to disperse and collect dust for every layer as in the main filter, a dust type collected to, or by, each layer of which is different. Such dust dispersion and collection effects may be superior when the prefilter is formed of multiple layers rather than a single layer. In addition, when the density of the prefilter is higher than that of the main filter, differential pressure may greatly increase when air is introduced into the main filter, and thus, fuel efficiency of an engine may be greatly decreased. Density values may be as follows for respective layers: first nonwoven synthetic fiber layer of prefilter<second nonwoven synthetic fiber layer of prefilter<bulky layer of main filter<intermediate layer of main filter<compact layer of main filter.

In accordance with an embodiment of the present disclosure, the first and second nonwoven synthetic fiber layers have respectively a thickness of 10 to 35 mm.

In accordance with an embodiment of the present disclosure, the moisture absorbent may be silica. In the case of general filters, collected dust may escape due to diffusion effects when the size of dust is large or a flow rate increases. When the prefilter includes the moisture absorbent adsorbed thereto, a nanoscale moisture absorbent is adsorbed onto a surface of a fiber, and thus, a moisture coating effect onto a surface of a fiber increases with increasing moisture. Moisture additionally may collect dust due to the moisture coating and an escape of the collected dust is prevented. Accordingly, the prefilter may have a superior dust collection ability.

In accordance with an embodiment of the present disclosure, the moisture absorbent may have an average particle diameter of 1 to 25 nm. When the surface of the fiber has the moisture absorbent adsorbed thereto, absorption ability thereof depends upon the average particle diameter of the moisture absorbent. In addition, when an average particle diameter of the moisture absorbent is several nanometers, dust collection ability may be increased by coating the surface of the fiber with moisture. In particular, when an average particle diameter of the moisture absorbent is less than 1 nm, the moisture absorbent may not uniformly adsorbed onto the surface of the fiber. When the average particle diameter is larger than 25 nm, an adsorbed moisture absorbent may easily escape. An average particle diameter of the moisture absorbent may be 10 to 20 nm, and further may be 15 nm.

A total adsorption amount of the moisture absorbent may be 20 to 30 $g/cm^2$. In particular, when the total adsorption amount of the moisture absorbent is less than 20 $g/cm^2$, a coating amount of each layer of the prefilter and mechanical bindability may be decreased, and thus, dust may escape. When the total adsorption amount is greater than 30 $g/cm^2$, ventilation resistance may increase due to an excessive coating amount.

In accordance with an embodiment of the present disclosure, the thickness of the prefilter may be 20 to 70 mm.

In accordance with an embodiment of the present disclosure, the nonwoven synthetic fiber may include 60 to 70% by weight of polyethylene terephthalate and 30 to 40% by weight of polymethylmethacrylate. In particular, when the content of the polyethylene terephthalate is less than 60% by weight, the amount of the synthetic fiber may be decreased and thus density and a dust collection amount may be decreased. When the content of the polyethylene terephthalate is greater than 70% by weight, the content of a binder may be decreased, and thus, bindabiliy between each layer may be decreased.

In accordance with an embodiment of the present disclosure, the nonwoven synthetic fiber of the prefilter may have an average pore size of 300 to 1000 μm. In particular, when the average pore size is less than 300 μm, it may be smaller than that of the bulky layer of the main filter, and thus, ventilation resistance may increase. When the average pore size is greater than 1000 μm, collection efficiency for dust having a particle size of 5 to 200 μm may be decreased.

In accordance with an embodiment of the present disclosure, the main filter may include a compact layer including a nonwoven synthetic fiber having an average pore size of 30 to 50 μm; an intermediate layer including a nonwoven synthetic fiber having an average pore size of 50 to 150 μm and being formed on the compact layer; and a bulky layer including nonwoven synthetic fiber having an average pore size of 250 to 350 μm and being formed on the intermediate layer, and the moisture absorbent may be adsorbed to the main filter.

In accordance with an embodiment of the present disclosure, a total adsorption amount of the moisture absorbent adsorbed to the main filter may be 70 to 80 g/cm². In particular, when a total adsorption amount of the moisture absorbent is less than 70 g/cm², dust collection performance may be poor. When a total adsorption amount of the moisture absorbent is greater than 80 g/cm², production costs may increase.

In accordance with an embodiment of the present disclosure, the compact layer may be made of a nonwoven synthetic fiber having an average pore size of 30 to 50 μm. In particular, when an average pore size of the nonwoven synthetic fiber is less than 30 μm, output of an engine may be decreased due to ventilation resistance etc. When the average pore size of the nonwoven synthetic fiber is greater than 50 μm, there may be problems in collecting dust having a particle size of 0.1 to 0.5 μm. The average pore size of the nonwoven synthetic fiber may be 35 to 45 μm, and further may be 40 μm. When an average pore size of the compact layer is 30 to 50 μm, i.e., the average pore size may be ultrafine, dust having a size of 0.1 to 5.0 μm may be collected. In particular, the compact layer may collect dust which may cause abrasion of an engine and air flow sensor error.

In addition, the compact layer may have an average density of 0.08 to 0.15 g/cm³ and a thickness of 0.3 to 1.5 mm. In particular, when the compact layer has an average density of less than 0.08 g/cm³, collection performance for dust having a particle size of 0.1 to 0.5 μm may be decreased. When the compact layer has an average density of greater than 0.15 g/cm³, output of an engine may become decreased due to ventilation resistance, etc. In addition, when the thickness of the compact layer is thinner than 0.3 mm, collection performance for dust having a particle size of 0.1 to 0.5 μm may be decreased. When the thickness of the compact layer is greater than 1.5 mm, collection performance for dust having a particle size of 0.1 to 0.5 μm may increase, but the thicknesses of the intermediate layer and the bulky layer may be decreased. As a result, the amount of dust collected to the intermediate layer and the bulky layer may be decreased.

In accordance with an embodiment of the present disclosure, the intermediate layer may be a nonwoven synthetic fiber having an average pore size of 50 to 150 μm. In particular, when the nonwoven synthetic fiber has an average pore size of less than 50 μm, ventilation resistance may increase and thus output of an engine may be decreased. When the nonwoven synthetic fiber has an average pore size of greater than 150 μm, dust collection performance of the bulky layer may be decreased. The average pore size of the nonwoven synthetic fiber may be 95 to 105 μm, and may further be 100 μm.

In addition, the intermediate layer may have an average density of 0.04 to 0.1 g/cm³ and a thickness of 0.5 to 1.5 mm. In particular, when the intermediate layer has an average density of less than 0.04 g/cm³, ventilation resistance may increase and thus output of an engine may be decreased. When the intermediate layer has an average density of greater than 0.1 g/cm³, dust collection performance of the intermediate layer may be decreased. In addition, when the thickness of the intermediate layer is less than 0.5 mm, collection performance for dust having a particle size of 0.5 to 100 μm may be decreased. When the thickness of the intermediate layer is greater than 1.5 mm, ventilation resistance may increase.

In accordance with an embodiment of the present disclosure, the bulky layer may be a nonwoven synthetic fiber having an average pore size of 250 to 350 μm. In particular, when the nonwoven synthetic fiber has an average pore size of less than 250 μm, ventilation resistance may increase. When the nonwoven synthetic fiber has an average pore size of greater than 350 μm, collection performance for dust having a particle size of 0.1 to 5.0 μm may become decreased. The average pore size of the nonwoven synthetic fiber may be 290 to 310 μm, and may further be 300 μm. The average diameters of the bulky layer and the intermediate layer may be larger than that of the compact layer, and thus, dust having a particle size of 0.5 to 100 μm may be advantageously collected.

In accordance with an embodiment of the present disclosure, the bulky layer may have an average density of 0.02 to 0.07 g/cm³ and a thickness of 1 to 2.5 mm. In particular, when the bulky layer has an average density of less than 0.02 g/cm³, dust collection efficiency of the bulky layer may be decreased. When the bulky layer has an average density of greater than 0.07 g/cm³, ventilation resistance may increase and thus output of an engine may be decreased. The bulky layer may collect relatively-large-size dust having a particle size of 0.5 to 100 μm. The air filter may collect about 80% or more of dust. In addition, when the thickness of the bulky layer is less than 1 mm, fine dust may be introduced into the interior of an engine. When the thickness of the bulky layer is greater than 2.5 mm, excessive ventilation resistance may occur, and thus, output of an engine may be decreased. The thickness of the bulky layer may be 1 to 2 mm.

In accordance with an embodiment of the present disclosure, the long-life air filter for automobiles may have an absorption ability of 1 to 20 cm/min. Here, the absorption ability may mean a moisture absorption degree, i.e., an absorbed distance per minute. That is, a distance of 1 to 20 cm per minute may be adsorbed when the air filter of the present disclosure is soaked in water.

Figure 4:
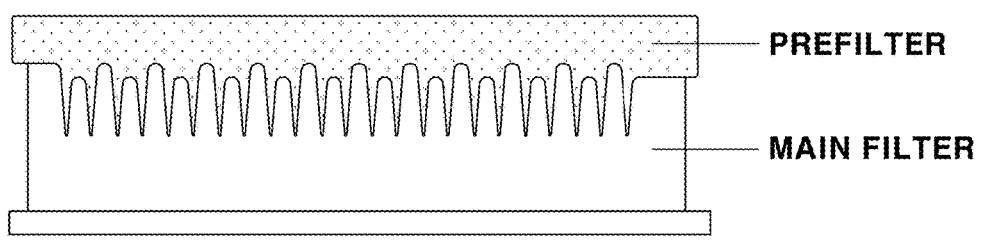
FIG. 4 illustrates an air filter according to embodiments of the present disclosure.

FIG. 4 illustrates an air filter according to embodiments of the present disclosure. As illustrated in FIG. 4, the air filter may be composed of a prefilter formed at an upper part and a main filter formed at a lower part.

Meanwhile, the present disclosure provides a method of manufacturing a long-life air filter for automobiles, the method may include: (a) a step of forming a nonwoven web after carding a synthetic fiber; (b) a step of combining the web by a needle punching process; (c) a step of respectively forming a main filter and a prefilter by passing the combined web through a press roll; (d) a step of respectively impregnating the main filter and the prefilter with a moisture absorbent solution; (e) a step of respectively drying the impregnated main filter and prefilter; and (f) a step of manufacturing an air filter by laminating the prefilter on the main filter.

FIG. 5 illustrates a process flow diagram of manufacture of an air filter according to embodiments of the present disclosure. As shown in FIG. 5, first, a synthetic fiber is carded. Subsequently, the carded synthetic fiber is subjected to a combining step to form a web, and a main filter and prefilter formed by combining the web through a needle punching process are impregnated with the moisture absorbent solution. Next, drying is performed and then the main filter and the prefilter are wound. Subsequently, these filters are laminated to manufacture an air filter.

In accordance with an embodiment of the present disclosure, step (c) may be carried out at 130 to 150° C. for 30 sec to 3 min, and may be at 140° C. for one minute. In addition, in step (c), the prefilter may be made of a nonwoven synthetic fiber having an average density of 0.01 to 0.5 g/cm$^3$, or a first nonwoven synthetic fiber having a density of 0.031 to 0.5 g/cm$^3$ and a second nonwoven synthetic fiber having an average density of 0.01 to 0.03 g/cm$^3$.

In accordance with an embodiment of the present disclosure, in step (c), the main filter may include a compact layer including a nonwoven synthetic fiber having an average pore size of 30 to 50 μm; an intermediate layer including a nonwoven synthetic fiber having an average pore size of 50 to 150 μm and being formed on the compact layer; and a bulky layer including nonwoven synthetic fiber having an average pore size of 250 to 350 μm and may be formed on the intermediate layer.

In accordance with an embodiment of the present disclosure, the moisture absorbent solution of step (d) may be a solution in which a moisture absorbent composed of silica is dispersed in a colloidal state.

In accordance with an embodiment of the present disclosure, the drying of step (e) may be carried out at 40 to 100° C. for three to seven hours. In particular, when the drying temperature is lower than 40° C., drying time may be extended. When the drying temperature is higher than 100° C., silica may bond together, and thus, water repellency may occur. In addition, when the drying time is shorter than three hours, drying might not be normally performed. When the drying time is longer than seven hours, a total manufacturing time may be increased. Drying may be performed at 70° C. for five hours.

A long-life air filter according to the present disclosure may be manufactured according to the aforementioned method since the moisture absorbent may be uniformly adsorbed onto a fiber surface of the prefilter and thus desorption due to external impact may not occur when the synthetic fiber is manufactured into a nonwoven form and then impregnated with the moisture absorbent solution and subjected to a drying process. If a process order is changed, i.e., if a nonwoven form is manufactured after performing adsorption of the moisture absorbent, the moisture absorbent adsorbed to the surface of the fiber may be detached or separated due to subsequent processes, and thus, absorption ability may be decreased.

The air filter for automobiles of the present disclosure may use a gravity effect, inertia effect, blocking effect, and diffusion effect to collect dust. In particular, with regard to the gravity effect, particles approaching the fiber through air flow may deviate from the air flow due to gravity and may be precipitated on the fiber of the filter to be collected.

With regard to an inertia effect, particles may deviate from an air flow due to inertia and collide with the fiber. Such an effect may increase when particle sizes are large, density is high, speed is high, and a fiber size is small. A collection effect may be accomplished due to such effect.

With regard to a blocking effect, when particles moving according to an air flow approach the fiber, the particles may be captured due to the size of the particles. Such an effect may be affected by the size of the fiber and a proportion of particle sizes. Such an effect is useful in collecting intermediate-size or larger particles.

With regard to a diffusion effect, small particles are easily caught by a small-size fiber at a low speed by Brownian motion due to collision between gas molecules and particles, and such effect is not affected by particle density. In particular, with regard to the diffusion effect, escape of certain-size or more dust or dust collected at a constant flow rate may be decreased by treating the prefilter with the moisture absorbent, thereby increasing dust collection amount.

Additionally, dust may be collected by an electrostatic force. Due to the electrostatic force, (−) or (+)-charged particles among particles floating in the air may be collected by electrostatic force to a fiber of a filter which has a permanent electric polarizability and forms an electric field for the surrounding environment.

Therefore, the long-life air filter for automobiles according to the present disclosure may be manufactured by adsorbing the moisture absorbent to the prefilter composed of the nonwoven synthetic fiber having a specific average density and the main filter formed of three-layer nonwoven synthetic fibers having specific average pore sizes, and thus ultrafine dust particles are collected and a dust collection amount is greatly increased, compared to existing filters. Accordingly, maintenance costs may be reduced.

In addition, even when only the nanoscale moisture absorbent, without a separate binder, is applied to the prefilter of the present disclosure, adsorption is facilitated. In addition, by adsorbing the moisture absorbent to all of the compact layer, the intermediate layer and the bulky layer of the prefilter, an escape of dust collected from the air is prevented. Accordingly, a dust collection amount of the filter may be increased and thus abrasion resistance and durability of an engine are increased, thereby increasing engine lifespan.

Hereinafter, the present disclosure will be described in more detail with reference to the following Examples. The scope of the present disclosure is not limited to the following Examples and covers modifications of the technical spirit substantially equivalent thereto.

Manufacturing Example 1: Manufacture of First Prefilter

To manufacture a prefilter, a synthetic fiber having an average density of 0.026 g/cm$^3$ was used in a carding process. Subsequently, the carded synthetic fiber was formed into a web form. Subsequently, the web was subjected to needle punching of about 700 times and thermally set at 140° C. for one minute, thereby manufacturing a first prefilter having a thickness of 6 mm.

Manufacturing Example 2: Manufacture of Second Prefilter

So as to manufacture a prefilter, a first synthetic fiber having an average density of 0.04 g/cm$^3$ and a second synthetic fiber having an average density of 0.02 g/cm$^3$ were used in a carding process. Subsequently, the carded first and second synthetic fibers were uniformly laminated into a web form. Subsequently, the web was subjected to needle punching of about 700 times and thermally set at 140° C. for one minute, thereby manufacturing a second prefilter having a thickness of 4 mm.

FIG. 1 illustrates a sectional view of a second prefilter manufactured according to Manufacturing Example 2. As illustrated in FIG. 1, an upper part of the prefilter is formed of a first nonwoven synthetic fiber having an average density of 0.04 g/cm$^3$ and a lower part thereof is formed of a second nonwoven synthetic fiber having an average density of 0.02 g/cm$^3$.

Manufacturing Example 3: Manufacture of Main Filter

Figure 2:
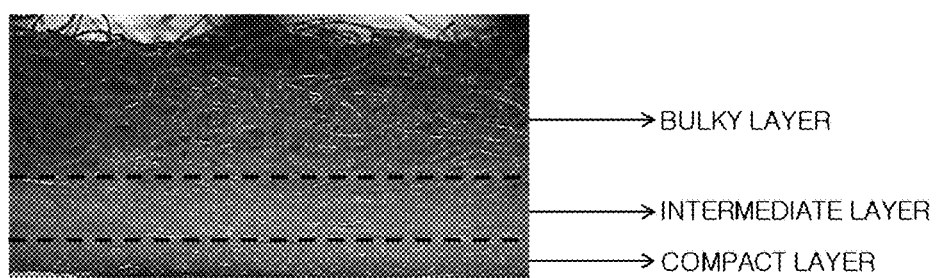
FIG. 2 illustrates a sectional view of a main filter manufactured according to Manufacturing Example 3 of the present disclosure.

To manufacture a main filter, a synthetic fiber having an average pore size of 40 μm was used in a compact layer carding process, a synthetic fiber having an average pore size of 100 μm was used in an intermediate layer carding process, and a synthetic fiber having an average pore size of 300 μm was used in a bulky layer carding process. Subsequently, the carded synthetic fibers were uniformly laminated into a web form. Here, the compact layer was formed in a thickness of 0.5 mm, the intermediate layer was formed in a thickness of 1 mm, and the bulky layer was formed in a thickness of 1.5 mm. Subsequently, the web was subjected to needle punching of about 700 times and thermally set at 140° C. for one minute, thereby manufacturing a main filter having a thickness of 3 mm. FIG. 2 illustrates a sectional view of a main filter manufactured according to Manufacturing Example 3.

Example 1

A moisture absorbent solution was prepared by mixing 45% by weight of silica sol (160 g of silica sol) having an average particle diameter of 12 nm and 55% by weight of water and dispersing the same in a colloid state. Subsequently, the first prefilter manufactured according to Manufacturing Example 1 and the main filter manufactured according to Manufacturing Example 3 were impregnated with the moisture absorbent solution. Subsequently, the impregnated first prefilter and main filter were dried at 70° C. for five hours, thereby manufacturing a prefilter wherein fine silica particles were adsorbed to a surface of a fiber. Here, a total adsorption amount of the moisture absorbent adsorbed to the first prefilter was 30 g/cm$^2$, and a total adsorption amount of the moisture absorbent adsorbed to the main filter was 75 g/cm$^2$. Subsequently, the main filter and the prefilter were laminated, thereby manufacturing an air filter for automobiles.

Example 2

An air filter for automobiles was manufactured in the same manner as in Example 1, except that the second prefilter manufactured according to Manufacturing Example 2 was used instead of the first prefilter. Here, a total adsorption amount of the moisture absorbent adsorbed to the second prefilter was 30 g/cm$^2$ and a total adsorption amount of the moisture absorbent adsorbed to the main filter was 75 g/cm$^2$.

Comparative Example 1

A general air cleaner, not including a prefilter, was used.

Comparative Example 2

The first prefilter and the main filter of Example 1 were directly laminated without impregnating with the moisture absorbent solution to manufacture an air filter for automobiles.

Comparative Example 3

The first prefilter and the main filter of Example 2 were directly laminated without impregnating with the moisture absorbent solution to manufacture an air filter for automobiles.

Experimental Example 1

Properties such as air permeability, dust collection amount, pressure loss, initial efficiency, and lifespan efficiency of the air filters manufactured according to Examples 1 and 2 and Comparative Examples 1 to 3 were measured. Results are summarized in Table 1 below.

TABLE 1

| Classification | Comparative Example 1 | Comparative Example 2 | Comparative Example 3 | Example 1 | Example 2 |
|---|---|---|---|---|---|
| Air permeability (cc/cm$^2$/sec) | 55 to 70 | 300 ↑ | 240 ↑ | 200 ↑ | 160 ↑ |
| Dust collection amount (g) | 205.09 | 343.55 (68%↑) | 359.65 (75%↑) | 362.54 (77%↑) | 375.11 (83%↑) |
| Pressure loss (mmAq) | 86.28 | 97.64 (13%↑) | 104.62 (21%↑) | 109.69 (27%↑) | 113.54 (31%↑) |
| Initial efficiency (%) | 98.62 | 98.96 | 99.06 | 99.15 | 99.13 |
| Lifespan efficiency (%) | 99.59 | 99.77 | 99.80 | 99.81 | 99.86 |

As shown in Table 1, in the case of Comparative Example 1, air permeability is lowest, and thus, a dust collection amount and a pressure loss value are lowest. In addition, it can be confirmed that, in the cases of Comparative Examples 2 and 3, air permeability is highest, but dust collection amounts are low, compared to Examples 1 and 2.

On the other hand, it can be confirmed that, in the cases of Examples 1 and 2, air permeability is relatively low, compared to Comparative Examples 2 and 3, but dust collection amounts are relatively high at 77% and 83%. In addition, it can be confirmed that initial efficiency and lifespan efficiency are maintained at 99% or more. Accordingly, it can be confirmed that, by adsorbing the moisture absorbent to the prefilter having a specific average density and the main filter having the three-layer structure formed of nonwoven synthetic fibers, average diameters of which are different, superior lifespan efficiency is exhibited and, at the same time, various sizes of ultrafine dust particles are collected, thereby greatly increasing a dust collection amount, compared to existing filters.

Figure 3:
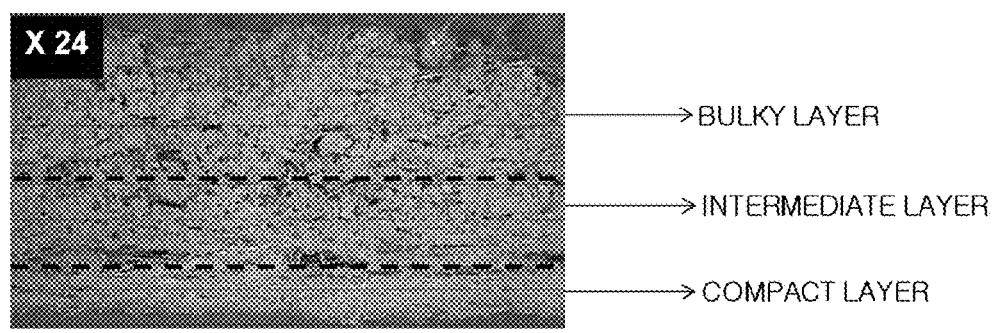
FIG. 3 illustrates a main filter of the present disclosure collecting dust.

FIG. 3 illustrates the main filter manufactured according to Example 1 by which dust is collected. As illustrated in FIG. 3, it can be confirmed that a large amount of dust having relatively large particle sizes is collected to the bulky layer, and relatively fine dust is adsorbed to the intermediate and compact layers.

Experimental Example 2

Using the air filters manufactured according to Example 2 and Comparative Examples 1 to 3, dust collection amounts depending upon humidity were measured. In particular, dust collection amounts were measured at 23° C. under humidity conditions of 50%, 55%, 60%, 70% and 80% according to KS R ISO 5011. Results are summarized in Table 2 below. In Table 2 below, increased amounts of dust collection and increased rates are calculated with respect to those of Comparative Example 1.

TABLE 2

| | Experimental conditions | Dust collection amount (g) | Increased amount of dust collection (g) | Increased rate of dust collection amount (%) | Pressure loss (mmAq) | Initial efficiency (%) | Terminal efficiency (%) |
|---|---|---|---|---|---|---|---|
| Comparative Example 1 | 23□/humidity of 50% | 145.08 | — | — | 86.94 | 98.62 | 99.62 |
| Comparative Example 2 | 23□/humidity of 50% | 152.54 | 7.46 | 5% | 88.29 | 98.74 | 99.63 |
| Comparative Example 3 | 23□/humidity of 50% | 218.16 | 73.08 | 50% | 97.33 | 99.03 | 99.76 |
| Example 2 | 23□/humidity of 50% | 281.14 | 126.06 | 92% | 109.56 | 99.09 | 99.84 |
| | 23□/humidity of 55% | 283.52 | 128.38 | 93% | 106.94 | 99.08 | 99.84 |
| | 23□/humidity of 60% | 287.10 | 131.98 | 94% | 107.18 | 99.10 | 99.82 |
| | 23□/humidity of 70% | 291.14 | 136.06 | 97% | 109.56 | 99.09 | 99.84 |
| | 23□/humidity of 80% | 295.11 | 139.92 | 97% | 113.54 | 99.13 | 99.86 |

As shown in Table 2, it can be confirmed that, in the cases of Comparative Example 1, to which the prefilter was not applied, and Comparative Example 2, to which adsorption of the moisture absorbent was not applied, remarkably low dust collection amounts are exhibited, compared to Example 2, and initial and terminal efficiencies thereof are relatively low.

In addition, it can be confirmed that, in the case of Comparative Example 3 to which adsorption of the moisture absorbent was not applied, a dust collection amount slightly increases, compared to Comparative Examples 1 and 2, but is low, compared to Example 1.

On the other hand, it can be confirmed that, in the case of Example 2 to which the prefilter and main filter including the moisture absorbent adsorbed thereto were applied, a dust collection amount per unit area is highest and a dust collection amount also increases with increasing humidity. Accordingly, it can be confirmed that, by adsorbing the moisture absorbent to the prefilter and the main filter, an escape of dust collected from air due to the moisture absorption is prevented, and thus, dust collection efficiency of the filters is increased.

As is apparent from the above description, since the long-life air filter for automobiles according to the present disclosure may include a prefilter made of a nonwoven synthetic fiber having a specific average density and a main filter formed of three-layer nonwoven synthetic fibers having specific average pore sizes, which include a moisture absorbent adsorbed thereto, a dust collection amount is greatly increased by collecting ultrafine dust particles and thus maintenance costs may be reduced.

In addition, adsorption is facilitated even when only nanoscale moisture absorbent, without a separate binder, is applied to the prefilter of the present disclosure. In addition, escape of dust collected from air by the moisture absorption may be prevented due to the moisture absorbent absorbed to all of a compact layer, an intermediate layer and a bulky layer of the prefilter, and thus, a dust collection amount of the filters is increased. Accordingly, abrasion resistance and durability of the engine are increased and thus lifespan of the engine is increased.

What is claimed is:

1. An air filter for automobiles comprising:
a main filter; and
a prefilter,
wherein the prefilter comprises a nonwoven synthetic fiber having an average density of 0.01 to 0.5 g/cm$^3$,
a moisture absorbent is adsorbed to the main filter and the prefilter,
a total adsorption amount of the moisture absorbent adsorbed to the main filter is 70 to 80 g/cm$^2$, and
a total adsorption amount of the moisture absorbent adsorbed to the prefilter is 20 to 30 g/cm$^2$.

2. An air filter for automobiles comprising:
a main filter;
a prefilter,
wherein the prefilter comprises a first nonwoven synthetic fiber layer having an average density of 0.031 to 0.5 g/cm$^3$; and
a second nonwoven synthetic fiber layer having an average density of 0.01 to 0.03 g/cm$^3$,
wherein a moisture absorbent is adsorbed to the main filter and the prefilter,
a total adsorption amount of the moisture absorbent adsorbed to the main filter is 70 to 80 g/cm$^2$, and
a total adsorption amount of the moisture absorbent adsorbed to the prefilter is 20 to 30 g/cm$^2$.

3. The air filter according to claim 1, wherein the moisture absorbent is silica.

4. The air filter according to claim 1, wherein the moisture absorbent has an average particle diameter of 1 to 25 nm.

5. The air filter according to claim 1, wherein a thickness of the prefilter is 20 to 70 mm.

6. The air filter according to claim 1, wherein the nonwoven synthetic fiber comprises 60 to 70% by weight of polyethylene terephthalate and 30 to 40% by weight of polymethylmethacrylate.

7. The air filter according to claim 1, wherein an average pore size of the nonwoven synthetic fiber is 300 to 1000 μm.

8. The air filter according to claim 2, wherein a thickness of each of the first and second nonwoven synthetic fiber layers is 10 to 35 mm.

9. The air filter according to claim 1, wherein the main filter comprises:

a compact layer comprising a nonwoven synthetic fiber having an average pore size of 30 to 50 μm;

an intermediate layer comprising a nonwoven synthetic fiber having an average pore size of 50 to 150 μm and being formed on the compact layer; and a bulky layer comprising a nonwoven synthetic fiber having an average pore size of 250 to 350 μm and being formed on the intermediate layer.

10. The air filter according to claim 9, wherein the compact layer has an average density of 0.08 to 0.15 g/cm$^3$ and a thickness of 0.3 to 1.5 mm.

11. The air filter according to claim 9, wherein the intermediate layer has an average density of 0.04 to 0.1 g/cm$^3$ and a thickness of 0.5 to 1.5 mm.

12. The air filter according to claim 9, wherein the bulky layer has an average density of 0.02 to 0.07 g/cm$^3$ and a thickness of 1 to 2.5 mm.

13. A method of manufacturing a long-life air filter for automobiles, the method comprising:

forming a nonwoven web after carding a synthetic fiber;

combining the web by a needle punching process;

respectively forming a main filter and a prefilter by passing the combined web through a press roll;

respectively impregnating the main filter and the prefilter with a moisture absorbent solution;

respectively drying the impregnated main filter and prefilter; and manufacturing an air filter by laminating the prefilter on the main filter, wherein a moisture absorbent is adsorbed to the main filter and the prefilter, a total adsorption amount of the moisture absorbent adsorbed to the main filter is 70 to 80 g/cm$^2$, and a total adsorption amount of the moisture absorbent adsorbed to the prefilter is 20 to 30 g/cm$^2$.

14. The method according to claim 13, wherein, in the steps of respectively forming the main filter and prefilter, the prefilter is made of a nonwoven synthetic fiber having an average density of 0.01 to 0.5 g/cm$^3$.

15. The method according to claim 13, wherein, in the steps of respectively forming the main filter and prefilter, the prefilter is made of a first nonwoven synthetic fiber having an average density of 0.031 to 0.5 g/cm$^3$ and a second nonwoven synthetic fiber having an average density of 0.01 to 0.03 g/cm$^3$.

16. The method according to claim 13, wherein, in the steps of respectively forming the main filter and prefilter, the main filter comprises:

a compact layer comprising a nonwoven synthetic fiber having an average pore size of 30 to 50 μm;

an intermediate layer comprising a nonwoven synthetic fiber having an average pore size of 50 to 150 μm and being formed on the compact layer; and a bulky layer comprising nonwoven synthetic fiber having an average pore size of 250 to 350 μm and being formed on the intermediate layer.

17. The method according to claim 13, wherein, in the step of impregnating the main filter and the prefilter with a moisture absorbent solution, the moisture absorbent solution is a solution in which a moisture absorbent composed of silica is dispersed in a colloidal state.

18. The method according to claim 13, wherein, in the step of respectively drying the impregnated main filter and prefilter, the drying s carried out at 40 to 100° C. for three to seven hours.

* * * * *